G. B. CARTER.
GAS STOVE.
APPLICATION FILED NOV. 21, 1910.
1,038,849.
Patented Sept. 17, 1912.
2 SHEETS—SHEET 1.
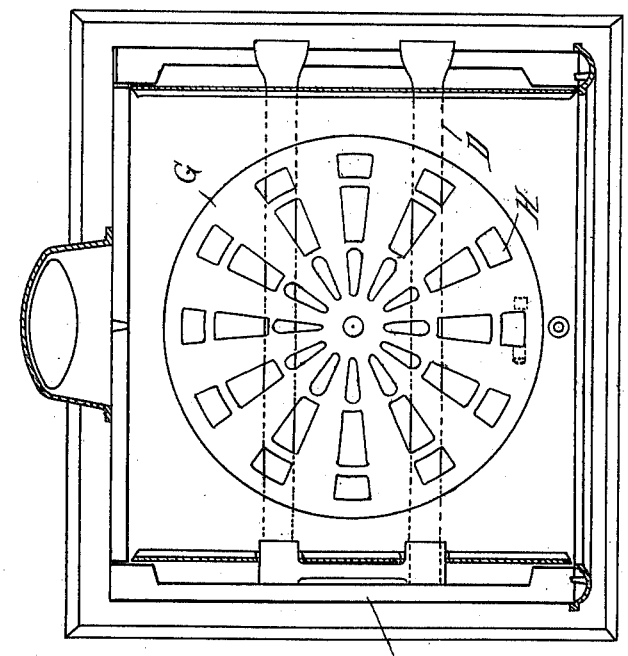
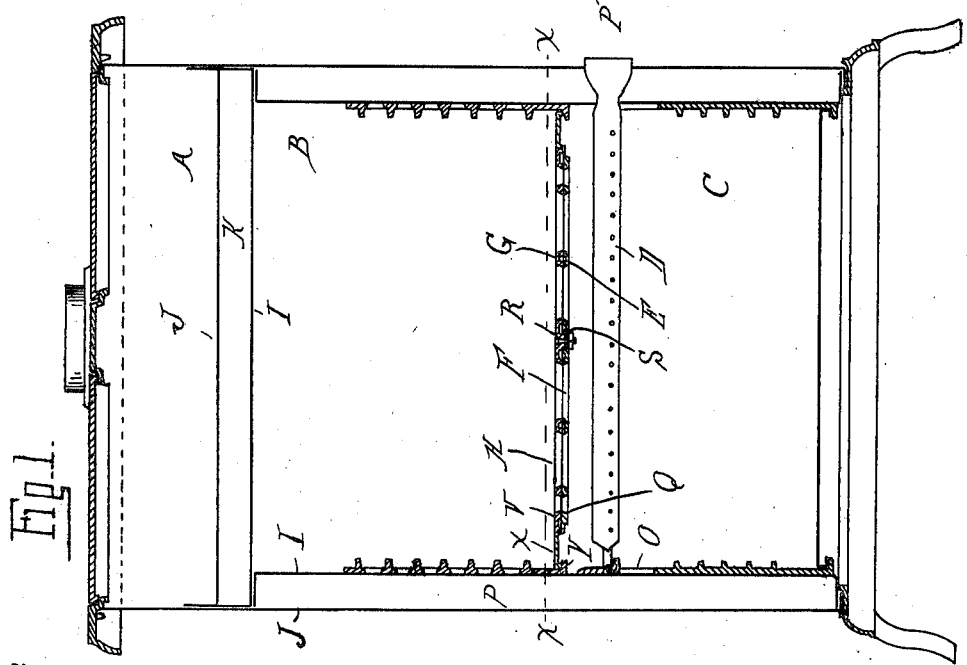

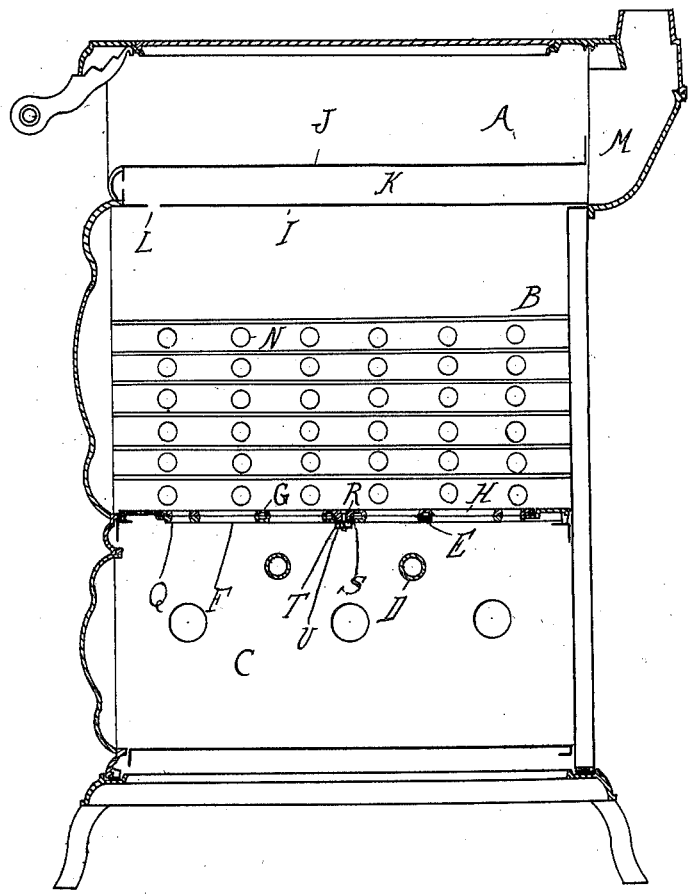

UNITED STATES PATENT OFFICE.

GEORGE B. CARTER, OF DETROIT, MICHIGAN, ASSIGNOR TO THE H. WETTER MANUFACTURING COMPANY, OF MEMPHIS, TENNESSEE, A CORPORATION OF WEST VIRGINIA.

GAS-STOVE.

1,038,849.	Specification of Letters Patent.	Patented Sept. 17, 1912.

Application filed November 21, 1910. Serial No. 593,399.

*To all whom it may concern:*

Be it known that I, GEORGE B. CARTER, a citizen of the United States of America, residing at Detroit, in the county of Wayne and State of Michigan, have invented certain new and useful Improvements in Gas-Stoves, of which the following is a specification, reference being had therein to the accompanying drawings.

My invention relates to gas or vapor burning stoves, and has among the objects thereof, to provide improved means for controlling the oven burners whereby the oven may be subjected to direct heat from the burners or merely to indirect heat, and to provide for a uniform distribution within the oven of both the direct and indirect heat.

Other objects of my invention will more fully hereinafter appear.

The invention resides in the peculiar construction, arrangement and combination of parts as more fully hereinafter described and particularly set out in the claims.

In the drawings,—Figure 1 is a central vertical section transversely of a stove embodying my invention; Fig. 2 is a vertical section at right angles to Fig. 1; and Fig. 3 is a section on line x—x Fig. 1.

For the purpose of my invention, the stove may be divided into any desired number of compartments, but I have shown the invention as applied to a standard construction of gas stove or range having the usual top compartment A, the baking oven B, and the broiling oven C arranged below the baking oven. Positioned within the broiling oven are the oven burners D, and arranged above and in proximity to these burners is a transverse partition E which separates one oven from the other. This partition is provided with a plurality of apertures F equally distributed over the central portion thereof and controlled by a rotary damper G having apertures H complementary to the apertures F and which are adapted to be moved into and out of operative relation thereto upon the rotation of the damper. The walls of the ovens are formed in the usual manner by spaced inner and outer casings I and J, providing air chambers therebetween. The chamber K of the top wall is however in communication with the baking oven by means of one or more apertures L preferably arranged adjacent one end thereof, and has its opposite end opening into the flue M, while each of the side walls is provided with apertures N and O formed in the inner casing and connecting respectively the interiors of the baking and broiling ovens with the chamber between the spaced casings of the side walls.

When it is desired to subject the oven B to direct heat from the burners, the damper is adjusted to open the apertures F which permit the hot gas to pass directly into the oven, the gas discharging from the oven by means of the apertures L, chamber K, and flue M. To subject the oven B to indirect heat from the burners, the damper is adjusted to close the apertures F, the hot gas then passes through the apertures O into chambers P of the side walls, and from these chambers through the apertures N into the baking oven from which they discharge as above described. Each of the side walls is provided with a plurality of the apertures N equally distributed thereover so as to effect a uniform distribution within the oven of the indirect heat, and since the openings F are uniformly arranged over the central portion of the partition, an equal distribution of the gas when the latter passes directly into the oven, is also assured.

Because of the close proximity of the damper G to the burners, there is a tendency for the damper to warp under the intense heat which it is subjected to. I have therefore so arranged the damper in relation to the transverse partition as to effectively prevent warping. As shown, the partition E is provided upon the upper face thereof with a circular depression Q within which the apertures F are arranged. The damper G comprises a disk seated within the circular depression and having a projection or pivot pin R at the center thereof which engages an aperture S centrally arranged in relation to the circular depression. T is a bolt passing through an aperture U in the central projection R for securing the damper to its seat. By this arrangement of parts the damper is shielded to a considerable extent by the partition and also engages the latter at a plurality of points. In order that the upper face V of the damper may lie in the plane of the top surface X of the partition, the circular depression is formed of a depth equal to the thickness of the damper. The partition E preferably has a removable engagement with guides Y upon the side walls of the oven.

What I claim as my invention is:

1. In a gas stove, the combination of an oven having an apertured bottom and provided with chambered side walls, a damper controlling the apertured portion of the bottom, a chamber beneath said oven bottom in communication with the chambers of the side walls, a burner arranged directly beneath and in close proximity to the apertured portion of the bottom, the side walls being apertured to form a communication between the oven interior and the chambers of the side walls, and a flue, the oven top being provided with a chamber forming a communication between the oven interior and the flue.

2. In a gas stove, the combination of an oven having an apertured bottom and provided with chambered side walls, a damper controlling the apertured portion of the bottom, a chamber beneath said oven bottom in communication with the chambers of the side walls, and a burner arranged directly beneath and in close proximity to said apertured portion of the bottom, said side walls being apertured to form a communication with the oven interior and the chambers of the side walls.

3. In a gas stove, the combination of an oven including a bottom having a circular depression provided with a plurality of apertures, a rotary damper for controlling the apertured portion of the bottom positioned within said circular depression with its top face in the plane of the upper surface of the bottom, said oven having chambered side walls, a chamber beneath the oven in communication with the chambers of the side walls, the latter being apertured to form a communication between the oven interior and the chambers of the side walls, and a burner arranged in said chamber directly beneath and in proximity to said apertured portion of the bottom.

In testimony whereof I affix my signature in presence of two witnesses.

GEORGE B. CARTER.

Witnesses:
JAMES P. BARRY,
W. J. BELKNAP.